Patented Aug. 5, 1952

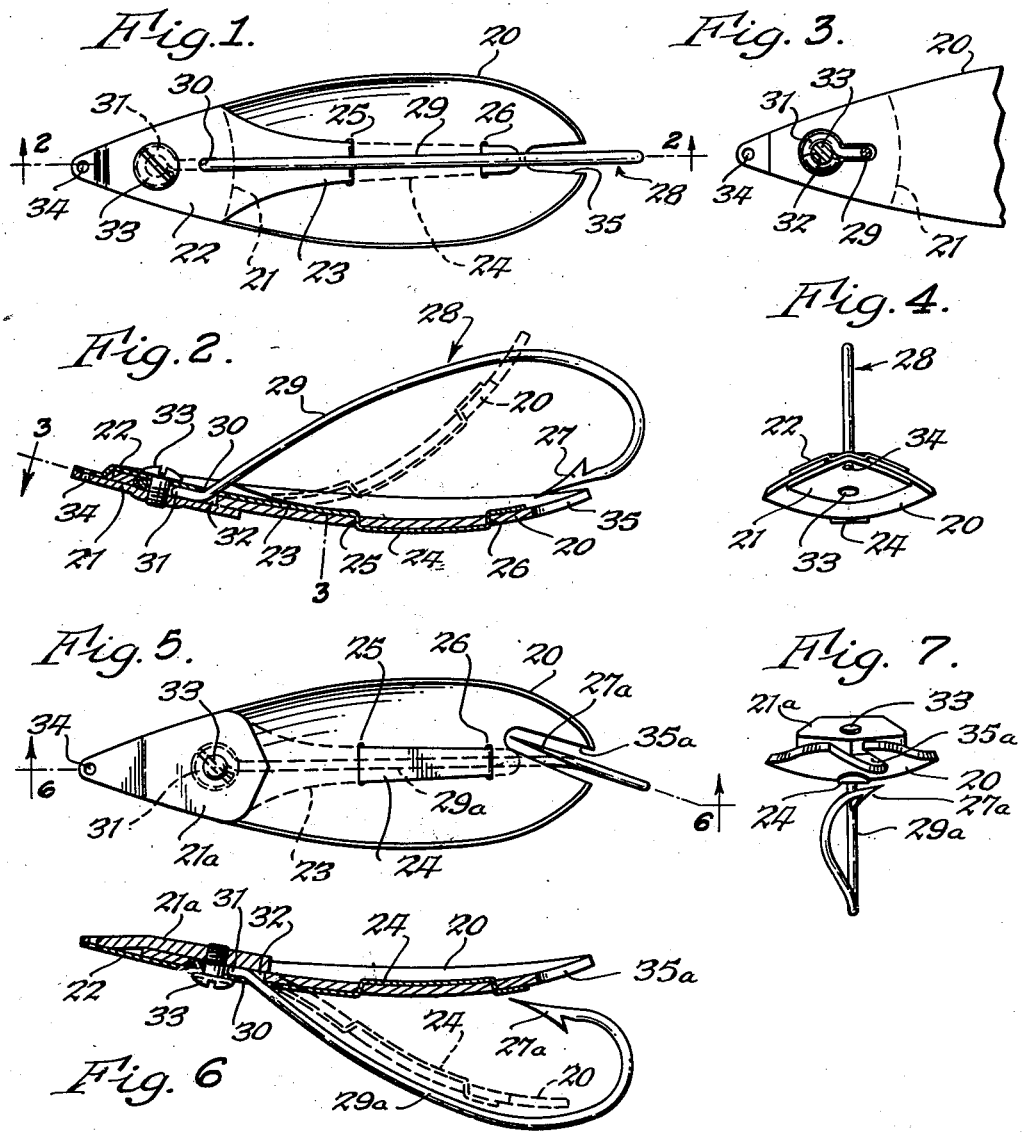

2,605,575

UNITED STATES PATENT OFFICE 2,605,575

FISH SPOON BAIT

Edward A. Ebert, Snyder, N. Y.

Substitute for abandoned application Serial No. 627,899, November 10, 1945. This application November 7, 1947, Serial No. 784,581

2 Claims. (Cl. 43—42.52)

This invention relates to artificial baits, such as those used in casting and trolling for game fish, and is a division of my copending patent application of Fish Spoon Bait having Serial No. 627,899, filed November 10, 1945 and since abandoned.

An object of the invention is to provide a bait of the spoon type which is weedless, i. e. that can be cast or trolled into and through heavy growths of weeds without snagging or permitting weeds to attach or drape themselves on the bait and interfere with its effectiveness in luring fish to make a strike.

Another object is to provide a bait which will expose its hooks to strikes from different directions of approach.

Another object is to provide a bait having a soft body more nearly like the live bait it imitates.

Another object is to provide a bait which resists dislodgement once the hook is in a fish's jaw.

A further object is to use the body of the bait to guard the point of the hook from snagging weeds.

A still further object is to provide a bait which is relatively simple, durable and inexpensive.

Other objects, advantages and capabilities of the invention will appear from the following description of several embodiments thereof.

In the accompanying drawings:

Fig. 1 is a top plan of a spoon having a soft plastic body with its hook on the concave side.

Fig. 2 is a longitudinal section along line 2—2, Fig. 1.

Fig. 3 is a fragmentary sectional plan view taken along line 3—3, Fig. 2.

Fig. 4 is a front view of the spoon in Figs. 1–3.

Fig. 5 is a top plan view of another spoon having a plastic body with its hook on the convex side.

Fig. 6 is a longitudinal section along line 6—6 of Fig. 5.

Fig. 7 is a rear elevation of the spoon in Figs. 5 and 6.

In the embodiments of the invention shown in the drawings, a non-rigid body or spoon having concave-convex faces is provided.

The curvature and shape of such spoons is well known in the art, the particular action of a spoon depending upon curvature, center of gravity, etc. and other factors. Since the invention is not concerned with how this action is obtained, any of the well known shapes may be used and those shown are for illustrative purposes only.

The bait as illustrated in Figs. 1–4 has its body 20 made of tough resilient plastic material, such as one of the polyvinyl alcohols, polyvinyl butyrals or other similar rubber-like material. It may be produced in attractive colors and made clear or opaque. Also, it may be compounded to have various degrees of resilience.

Since this material is very light in weight I prefer to use a nose piece 21 of metal, to give weight. This nose piece 21 is shaped to conform to the curvature of the body 20 and blends into the outline of the body. Opposite the nose piece 21 with the body 20 sandwiched between, I provide a spring member 22 having an outline identical with the nose piece 21 except that a tail portion 23 extends along the center line of the body 20. This tail portion 23 is formed with an offset part 24 which engages the opposite face of the body when the tail portion is threaded through the openings 25 and 26 in the body 20, as shown clearly in Figs. 1 and 2.

The tail portion 23 serves to stiffen or give more rigidity to the body 20 in a longitudinal direction, and thus prevents the point 27 of the hook 28 from gathering weeds, yet does not hinder the hooking of a fish.

The hook shank 29 passes through an opening 30 in the spring member 22 and the hook's eye 31 is positioned in a keyhole slot 32 in the body 20. Thus, when the screw 33 is inserted through a hole in the spring member 22, through the eye 31 and is threaded into the head piece 21, all parts of the bait are rigidly mounted together. The foremost end of the spring member 22 is bent downwardly through the thickness of the body 20 to lay against the head piece 21, both being perforated to form the hole 34 for attachment of the usual leader and swivel. A notch 35 may be cut in the body 20 for relative free movement of the body 20 with respect to the point 27 of the hook.

With a soft plastic body it is possible to hook a fish while his jaws engage edgewise against the body 20; but when a hard spoon body is used the width of the spoon prevents a fish from closing his jaws on the hook when in this position. The soft body can fold and flex out of the way of the hook for exposing the hook to the fish's mouth and if the fish does not get hooked during the first strike it probably will strike again because of the resemblance between the feel of the bait and food found in nature.

The bait shown in Figs. 5–7 is similar to the one just described in Figs. 1–4 but rides with the point of its hook 28 up instead of down. To offset the lowering of the center of gravity, the head piece 21a, which in this form is on top, may be made heavier.

The hook used on this bait is of the "Carlisle" type having the point 27a set at an angle to its shank 29a, and projecting beyond the side of its shank as shown clearly in Figs. 5 and 7. The body 20 being of a soft, resilient and flexible rubber-like material and the hook point 27a being at an angle with the longitudinal axis of the bait, there are few angles from which a fish could not be hooked on this bait. The notch 35a is also at an angle coincident with that of the offset hook point 27a.

In all of the embodiments shown in Figs. 1–7, the eye of the hook is larger than the openings in either the spring members or the head pieces so that if the screws loosen or drop out, the fish would not be lost. Also, the head pieces and spring members are locked together by the snap on the leader (not shown) always used with baits of this kind.

It will be understood that various changes in the details, materials and arrangements of parts, which have been herein described and illustrated in order to explain the nature of the invention, may be made by those skilled in the art within the principle and scope of the invention, as expressed in the appended claims.

I claim as my invention:

1. A fish bait comprising a spoon-like body of sheet material having a stiffened nose portion, a resilient element attached at its forward end to said nose portion, extending rearwardly along the longitudinal axis of said body and secured to said body intermediate of the ends and side edges of the body, and a hook attached at one end to said nose portion, said hook having a shank diverging from said body rearwardly thereof for a first portion of the length of said shank and said hook having another portion of said shank behind said first portion curved toward said body and pointing forwardly thereof with the free end of said hook disposed in close proximity to the rear end of the body and shielded thereby from weeds, but clearing the body when the body and hook are squeezed together by a fish seizing the bait, to flex the body, thereby exposing the point of the hook for engagement of the fish, the rear end of the body extending rearwardly beyond the pointed end of said hook and having a through opening through which said hook's point may move.

2. The fish bait as recited in claim 1 wherein the resilient element attached at its forward end to said nose portion has sharply turned portions directed substantially perpendicular to the general plane of that element and said body, whereby said element may pass through openings in said body and lie adjacent and parallel to the opposite sides of the sheet material of said body.

EDWARD A. EBERT.

REFERENCES CITED

The following references are of record in the file of this patent:

UNITED STATES PATENTS

| Number | Name | Date |
|---|---|---|
| 378,678 | Harlow | Feb. 28, 1888 |
| 1,264,626 | Foss | Apr. 30, 1918 |
| 1,450,777 | Hummel | Apr. 3, 1923 |
| 1,742,786 | Roberts | Jan. 7, 1930 |
| 2,163,378 | Horvath | June 20, 1939 |
| 2,206,486 | Nelson | July 2, 1940 |
| 2,215,908 | Lauby | Sept. 24, 1940 |
| 2,230,904 | Parkins | Feb. 4, 1941 |
| 2,514,938 | Craig | July 11, 1950 |